(12) United States Patent
Georgi et al.

(10) Patent No.: US 8,131,494 B2
(45) Date of Patent: Mar. 6, 2012

(54) ROTATABLE ORIENTATION INDEPENDENT GRAVITY SENSOR AND METHODS FOR CORRECTING SYSTEMATIC ERRORS

(75) Inventors: Daniel T. Georgi, Houston, TX (US); Carl M. Edwards, Katy, TX (US); Sheng Fang, Houston, TX (US); Rocco DiFoggio, Houston, TX (US); Robert A. Estes, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 550 days.

(21) Appl. No.: 12/328,181

(22) Filed: Dec. 4, 2008

(65) Prior Publication Data

US 2010/0145620 A1 Jun. 10, 2010

(51) Int. Cl.
*G01R 35/00* (2006.01)
(52) U.S. Cl. ........................................................ 702/90
(58) Field of Classification Search .................. 702/90, 702/150, 182–185, 188
See application file for complete search history.

(56) References Cited

U.S. PATENT DOCUMENTS

| | | | |
|---|---|---|---|
| 6,347,282 B2 | 2/2002 | Estes et al. | |
| 6,518,756 B1 * | 2/2003 | Morys et al. | 324/303 |
| 6,738,721 B1 * | 5/2004 | Drucke et al. | 702/95 |
| 6,895,678 B2 * | 5/2005 | Ash et al. | 33/313 |
| 6,975,112 B2 * | 12/2005 | Morys et al. | 324/303 |
| 7,065,449 B2 | 6/2006 | Brewster et al. | |
| 7,069,780 B2 | 7/2006 | Ander | |
| 7,093,370 B2 | 8/2006 | Hansberry et al. | |
| 7,249,419 B2 * | 7/2007 | Sato | 33/356 |
| 7,823,661 B2 * | 11/2010 | Mintchev et al. | 175/61 |
| 7,844,415 B1 * | 11/2010 | Bryant et al. | 702/151 |
| 2004/0111212 A1 | 6/2004 | Broeck | |
| 2009/0157341 A1 * | 6/2009 | Cheung | 702/85 |
| 2009/0254294 A1 * | 10/2009 | Dutta | 702/92 |

OTHER PUBLICATIONS

R.A. Estes, et al. "Development of a Robust Gyroscopic Orientation Tool for MWD Operations". SPE 63274. 2000 SPE Annual Technical Conference and Exhibition held in Dallas, Texas, Oct. 1-4, 2000.
R. Estes, et al. "Improvement of Azimuth Accuracy by Use of Iterative Total Field Calibration Technique and Compensation for System Environment Effects". SPE 19546. 64th Annual Technical Conference and Exhibition of the Society of Petroleum Engineers held in San Antonio, TX Oct. 8-11, 1989.
International Search Report and Written Opinion, Mailed Jun. 9, 2010, International Appln. No. PCT/US2009/064526, Written Opinion 10 pages, International Search Report 4 pages.

* cited by examiner

*Primary Examiner* — Edward Raymond
(74) *Attorney, Agent, or Firm* — Cantor Colburn LLP

(57) ABSTRACT

A method to correct for a systematic error of a sensor having a plurality of accelerometers configured to measure gravitational acceleration, the method including: rotating the plurality of accelerometers about a first axis; obtaining a first set of calibration measurements from the plurality of accelerometers from the rotation about the first axis; determining a first systematic error for each accelerometer in the plurality using the first set of calibration measurements; and removing the first systematic error from sensor measurements to correct for the systematic error.

20 Claims, 9 Drawing Sheets

TOP VIEW

SIDE VIEW

ROTATABLE ORIENTATION INDEPENDENT GRAVITY SENSOR AND METHODS FOR CORRECTING SYSTEMATIC ERRORS

BACKGROUND OF THE INVENTION

1. Field of the Invention

The invention disclosed herein relates to correcting systematic errors in a sensor. In particular, the present disclosure is an apparatus and method for correcting systematic errors in a sensor for measuring gravity.

2. Description of the Related Art

Exploration and production of hydrocarbons generally requires precise and accurate measurements of earth formations, which may contain reservoirs of the hydrocarbons. Many types of parameters related to earth formations are typically measured. One important type of parameter is gravitational acceleration.

By knowing the amount of gravitational acceleration present at a position in a borehole penetrating an earth formation, it is possible to determine the true vertical depth of the position. In addition, contents of a reservoir can be monitored by measuring a change in gravitational acceleration at a position in the borehole.

Sensors are generally used to measure a physical parameter such as gravitational acceleration or the force of gravity. Parameters such as gravity may be difficult to measure due to parameter values being very low or environmental constraints being imposed upon the sensor. In an effort to sense difficult to measure parameters, some sensors have a complex structure. As a result, these sensors can be prone to inaccuracies known as systematic errors.

Systematic errors are biases in a measurement or in an output of a sensor. The biases are such that the mean of many measurements differs significantly from the actual value of the parameter being measured. Systematic errors arise when the amount of error and the associated sign are unknown.

Systematic errors are very difficult to account for because the effect of these errors are only observable if these errors can be removed. Repeated measurements or averaging large numbers of measurements cannot be used to remove systematic errors.

There are several types of systematic errors. One type is "offset bias." With offset bias, the output of a sensor is offset a fixed amount from the true value throughout a range of values. Thus, when a true value is zero, the output of the sensor measuring the value indicates the fixed amount of offset, such as five units for example. When a true value such as 100 units is measured, the output of the sensor will be 105 units.

Another type of systematic error is proportional error, which may also be referred to as scaling factor or scaling sensitivity error. Proportional error is related to a proportion of the true value being measured. For example, if the true value of a force being measured is 100 units and the proportional error is plus ten percent, then the output of the sensor will be 110 units. If the true force being measured is ten units, then the output of the sensor will be 11 units.

In order to be able to perform accurate and precise measurements, it is important to be able to remove systematic errors.

Therefore, what are needed are techniques to remove or correct for systematic errors in sensors. In particular, the techniques need to be applied to sensors measuring the force of gravity in a borehole penetrating the earth.

BRIEF SUMMARY OF THE INVENTION

Disclosed is a method to correct for a systematic error of a sensor having a plurality of accelerometers configured to measure gravitational acceleration, the method including: rotating the plurality of accelerometers about a first axis; obtaining a first set of calibration measurements from the plurality of accelerometers from the rotation about the first axis; determining a first systematic error for each accelerometer in the plurality using the first set of calibration measurements; and removing the first systematic error from sensor measurements to correct for the systematic error.

Also disclosed is a sensor for measuring gravitational acceleration and correcting for systematic error, sensor including: a plurality of collocated accelerometers providing output used for measuring the gravitational acceleration, each accelerometer in the plurality having a direction of sensitivity wherein at least two of the accelerometers in the plurality have different directions of sensitivity; a rotational device configured to rotate the plurality of collocated accelerometers about a first axis; and a processing system in communication with the plurality of collocated accelerometers, wherein the processing system is configured to: obtain a first set of calibration measurements from the plurality of accelerometers from rotation of the plurality about the first axis; determine a first systematic error for each accelerometer in the plurality using the first set of calibration measurements; and removing the first systematic error from sensor measurements to correct for the systematic error.

Further disclosed is an apparatus for measuring gravitational acceleration in a borehole and correcting for systematic error, the apparatus including: a logging instrument; a plurality of collocated accelerometers disposed at the logging instrument, the plurality providing output used for measuring the gravitational acceleration, each accelerometer in the plurality having a direction of sensitivity wherein at least two of the accelerometers in the plurality have different directions of sensitivity; a rotational device configured to rotate the plurality of collocated accelerometers about a first axis; and a processing system in communication with the plurality of collocated accelerometers, wherein the processing system is configured to: obtain a set of calibration measurements from the plurality of accelerometers from rotation of the plurality about the first axis; determine a systematic error for each accelerometer in the plurality using the set of calibration measurements; and remove the first systematic error from sensor measurements to correct for the systematic error.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

Figure 1:
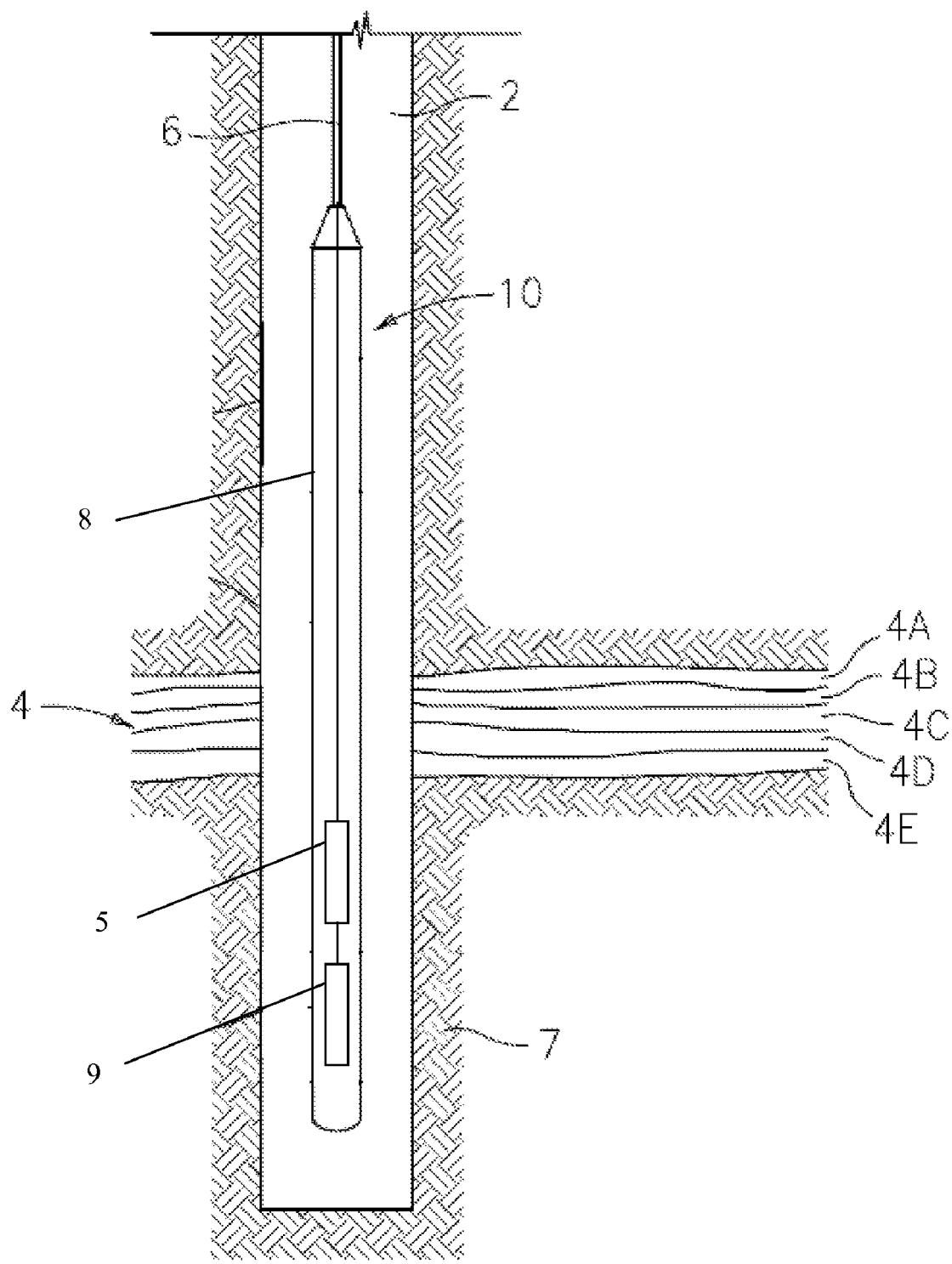
FIG. 1 illustrates an exemplary embodiment of a logging instrument in a borehole penetrating the earth.

The teachings provide techniques to measure the force of gravity or gravitational acceleration with high accuracy and high precision. The techniques decrease susceptibility to noise and random drift and correct for systematic error. In addition, the techniques can be used to measure orientation.

The techniques for measuring gravitational acceleration are now presented. In one embodiment, the techniques provide a sensor that includes a plurality of accelerometers disposed about a three-dimensional structure. "Disposed about" refers to the plurality of accelerometers being disposed at least one of on and in the three-dimensional structure in a side-by-side arrangement. Alternatively, the accelerometers may be coupled to each other in the side-by-side arrangement." The term "collocated" is used herein to describe that the accelerometers are located close to each other in the side-by-side arrangement either by being disposed about the same three-dimensional structure or by being coupled to each other. Each accelerometer of the plurality is used to make a measurement of gravity. The plurality of accelerometers provides a corresponding plurality of outputs related to the measurement of gravity. The outputs are combined to provide a measurement of gravity that is accurate and precise. By combining the outputs, the plurality of accelerometers provides a measurement of gravity that is less susceptible to noise and random drift than a measurement of gravity using only one accelerometer. In particular, noise and random drift can be reduced by the square root of the total number of accelerometers in the plurality. Accordingly, the techniques call for using hundreds of accelerometers in the plurality for a significant reduction of noise and random drift.

Some accelerometers measure a force in substantially one direction. The one direction may be referred to as "direction of measurement" or "direction of sensitivity". These types accelerometers can measure a vector component of gravity that is in line with the substantially one direction of measurement of the accelerometer. Because a value of gravity measured by these types of accelerometers is dependent upon the orientation of the accelerometer with respect to the direction of gravitational force, the output of the directional accelerometer has to be corrected. The techniques include a method for correcting the outputs of these types of accelerometers. In addition, the techniques include a method for determining the orientation of the plurality of accelerometers with respect to the direction of gravitational force.

The techniques provide for summing the corrected outputs using a square root of the sum of the squares method. This method provides for the reduction in noise and random drift.

As used herein, the terms "gravity" and "gravitational acceleration" are interchangeable. The term "gravitational force" relates to the force exerted upon an object due to gravity. By knowing the mass of the object and the gravitational force exerted upon the object, the gravitational acceleration can be determined. An accelerometer measuring gravitational acceleration may include measuring gravitational force.

For convenience, certain definitions are provided. The term "housing" relates to a structure of a logging instrument. The housing may be used to at least one of contain and support a device used with the logging instrument. The device can be the three-dimensional structure with the plurality of accelerometers. The term "three dimensional structure" relates to a structure requiring three dimensions to describe a location on the structure. The three-dimensional structure is part of the sensor. Accordingly, the three-dimensional structure is sized to fit within the housing of a logging instrument. The term "directional accelerometer" relates to an accelerometer that measures force of acceleration (and, therefore, acceleration) in substantially one direction. The term "net value for the gravitational acceleration" relates to a value of gravitational acceleration determined by using the measurement of gravitational acceleration from each accelerometer in the plurality of accelerometers. The terms "Nano Electromechanical System (NEMS)" and "Micro Electromechanical System (MEMS)" relate to "micromachines" or "machines on a chip." In general, NEMS and MEMS are fabricated from a substrate such as a silicon wafer. NEMS and MEMS are fabricated using techniques associated with fabricating solid state electronics. These techniques include photolithography, etching processes and micromachining. A MEMS device generally ranges in size from 20 micrometers to a millimeter, while components making up a MEMS device generally range in size between 1 to 100 micrometers. NEMS devices and components are even smaller.

Referring to FIG. 1, one embodiment of a well logging instrument 10 having a longitudinal axis 11 is shown disposed in a borehole 2. The logging instrument 10 can be used for measuring gravity. The logging instrument 10 includes an instrument housing 8 adapted for use in the borehole 2. The borehole 2 is drilled through earth 7 and penetrates formations 4, which include various formation layers 4A-4E. The logging instrument 10 is generally lowered into and withdrawn from the borehole 2 by use of an armored electrical cable 6 or similar conveyance as is known in the art. In the embodiment of FIG. 1, a sensor 9 is shown disposed within the housing 8. The sensor 9 includes the plurality of accelerometers disposed about a three-dimensional structure (i.e., collocated). FIG. 1 also depicts an electronic unit 5 shown disposed within the housing 8. The electronic unit 5 processes an output from each accelerometer in the plurality of accelerometers included in the sensor 9. The electronic unit 5 processes the outputs to determine the gravitational acceleration at the sensor 9. In addition, the electronic unit 5 can process measurements performed by the plurality of accelerometers to obtain calibration data and process the calibration data to correct for systematic errors. The gravitational acceleration at the sensor 9 can be affected by the formations 4.

It will be recognized that the various features as may be encountered in a subsurface environment may be referred to as "formations." Accordingly, it should be considered that while the term "formation" generally refers to geologic formations of interest, that the term "formations," as used herein, may, in some instances, include any geologic points of interest (such as a survey area).

For the purposes of this discussion, it is assumed that the borehole 2 is vertical and that the formations 4 are horizontal. The teachings herein, however, can be applied equally well in deviated or horizontal wells or with the formation layers 4A-4E at any arbitrary angle. The teachings are equally suited for use in logging while drilling (LWD) applications, measurement while drilling (MWD) and in open-borehole and cased-borehole wireline applications. In LWD/MWD applications, the logging instrument 10 may be disposed in a drilling collar. When used in LWD/MWD applications, drilling may be halted temporarily to prevent vibrations while the plurality of accelerometers 3 is used to perform a measurement of at least one of gravity and orientation. In addition to being configured to be conveyed by the armored electrical cable 6 or the drill collar attached to a drill string, the logging instrument 10 can also be configured to be conveyed by a slickline or coiled tubing.

Figure 2:
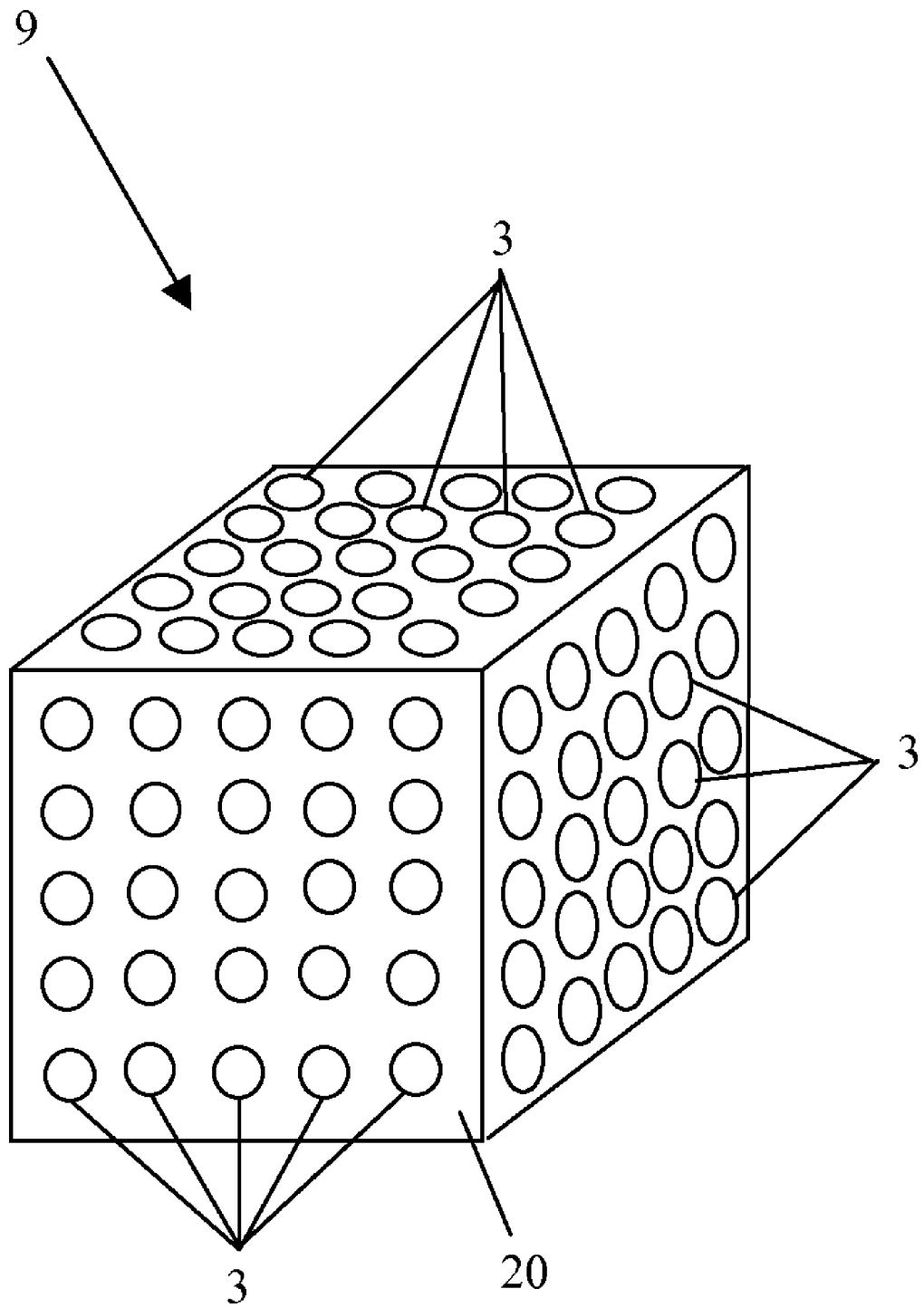
FIG. 2 illustrates an exemplary embodiment of a sensor for measuring gravitational acceleration.

FIG. 2 illustrates an exemplary embodiment of the sensor 9. Referring to FIG. 2, a plurality of accelerometers 3 is disposed upon a three-dimensional structure 20. In the embodiment of FIG. 2, the three-dimensional structure 20 has the shape of a cube. The three-dimensional structure 20 can also be other shapes, such as the curved shape depicted in a later embodiment for example, or a combination of shapes. As long as the position of each of the accelerometers 3 on the structure 20 is known, then any shape can be used. Referring to FIG. 2, the plurality of accelerometers 3 is shown disposed on three orthogonal sides of the structure 20. As discussed above, the techniques call for using hundreds of the accelerometers 3. In the embodiment of FIG. 2, the structure 20, shaped as a cube with a side dimension of about 2.54 centimeter (1 inch), can have over 100 of the accelerometers 3 on one side. Having such a large number of accelerometers 3 in a small area requires that the accelerometers 3 be built to at least one of nano-scale and micro-scale dimensions. Accelerometers 3 can be built to these small scales using solid state technology such as that used to fabricate semiconductor devices.

In one embodiment, the accelerometers 3 can be implemented by at least one of a Nano Electromechanical System (NEMS) and a Micro Electromechanical System (MEMS) as is known to those skilled in the art of NEMS and MEMS. In this embodiment, a proof mass is used to measure gravitational force. The proof mass is coupled to a diffraction grid such that at least one dimension of the diffraction grid changes with displacement of the proof mass. The diffraction grid is used along with a light source and a light detector to act as an interferometric displacement sensor. Light from the light source may be diffracted by the diffraction grid to provide diffracted light. Characteristics of the diffracted light can be measured by the light detector and correlated to the displacement of the proof mass to determine the gravitational force. By knowing the mass of the proof mass and the gravitational force, the gravitational acceleration can be determined.

Figure 3A:
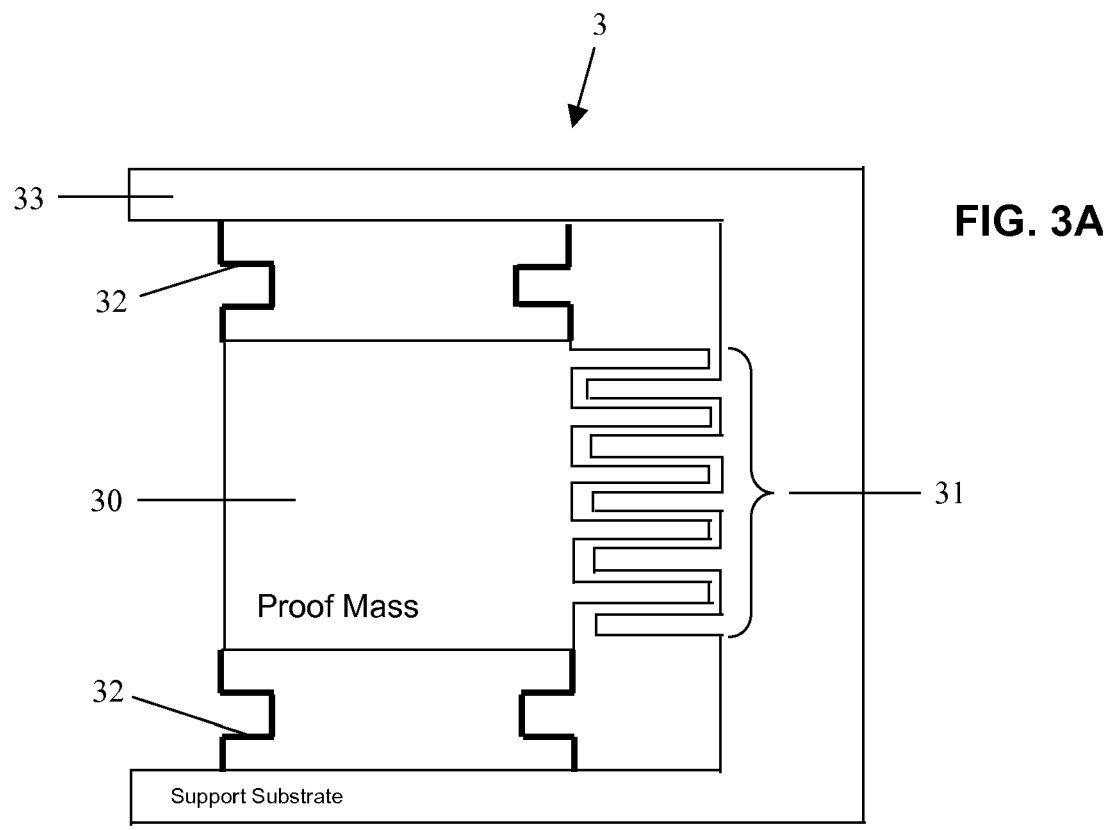
FIG. 3A and 3B, collectively referred to as FIG. 3, illustrate an exemplary embodiment of an accelerometer.

FIG. 3 illustrates an exemplary embodiment of one the accelerometers 3 that is implemented by at least one of a NEMS and a MEMS. A top view of the accelerometer 3 is depicted in FIG. 3A. Referring to FIG. 3A, the accelerometer 3 includes a proof mass 30 coupled to a diffraction grid 31. The proof mass 30 is suspended by springs 32 coupled to a support substrate 33. The springs 32 provide a counter-force to the force of gravity while allowing displacement of the proof mass 30 due to the force of gravity. In the embodiment depicted in FIG. 3A, the proof mass 30, the diffraction grid 31, and the springs 32 are implemented by at least one of the NEMS and the MEMS.

Figure 3B:
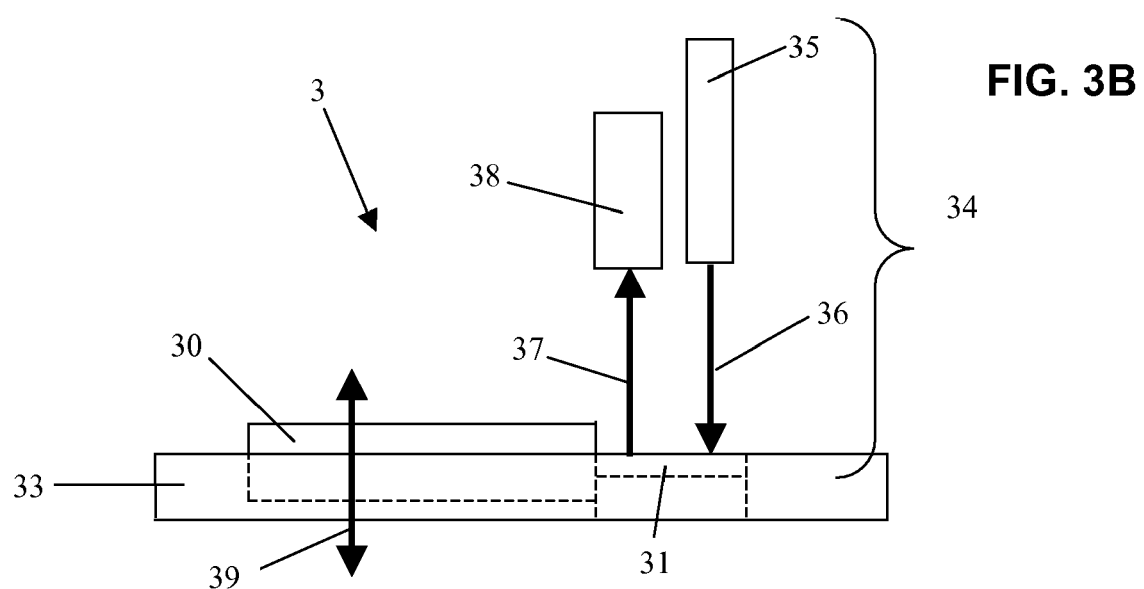

FIG. 3B illustrates a side view of the accelerometer 3. FIG. 3B depicts the accelerometer 3 with the light source and the light detector. The diffraction grid 31, a light source 35, and a light detector 38 form an interferometric displacement sensor 34. The light source 35 provides input light 36. The input light 36 diffracted by the diffraction grid 31 provides diffracted light 37. Referring to FIG. 3B, the springs 32 allow movement of the proof mass 30 in substantially direction 39. As the proof mass 30 moves, at least one dimension defining the diffraction grid 31 changes. In turn, intensity of a single mode of the diffracted light 37 is related to the at least one dimension. Thus, by measuring the intensity of the single mode of the diffracted light 37, displacement of the proof mass 30 can be determined. Further, the displacement can be correlated to an amount of gravitational force or gravitational acceleration imposed on the proof mass 30.

In one embodiment, the light source 35 can be implemented by a laser diode. In one embodiment, the light detector 38 can be implemented by a photodiode.

Figure 4:
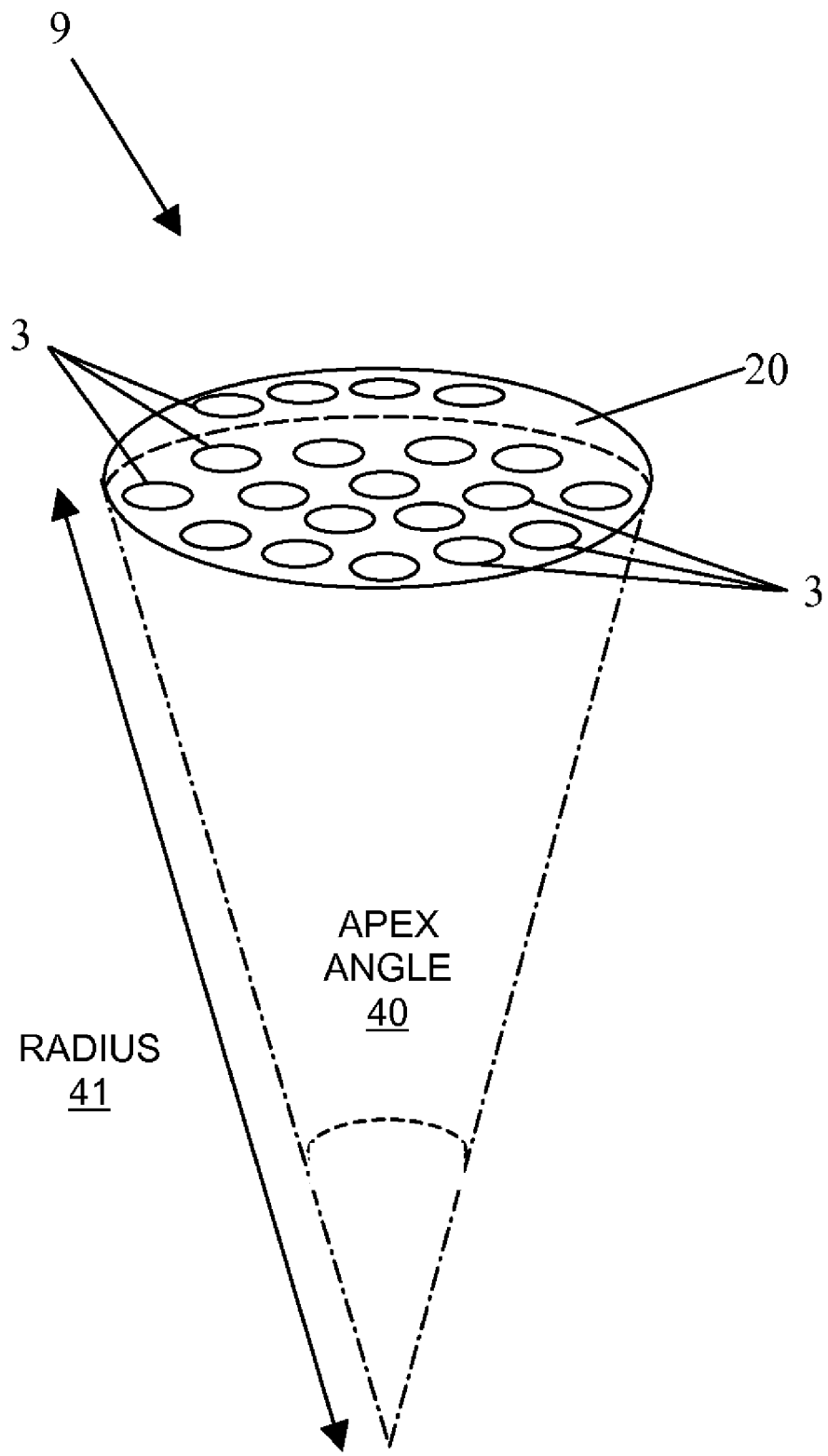
FIG. 4 illustrates another exemplary embodiment of a sensor for measuring gravitational acceleration.

FIG. 4 illustrates an exemplary embodiment of the plurality of accelerometers 3 disposed upon the three-dimensional structure 20 that is a curved surface. The curved surface is a portion of the surface of a sphere. In the embodiment of FIG. 4, the portion of the sphere has an apex angle 40 of about four degrees and a radius 41 of about 21.38 mm (0.84 in), which is about the radius of a golf ball.

Figure 5:
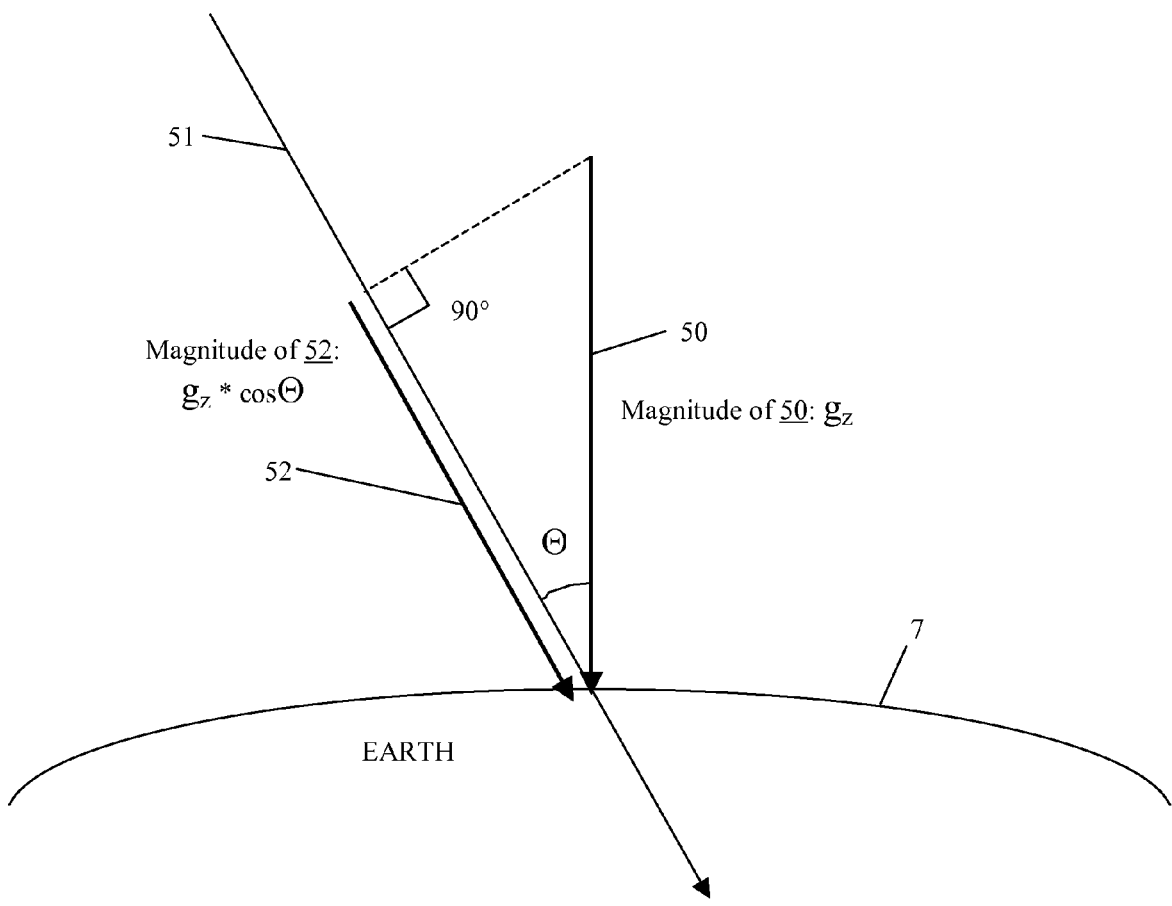
FIG. 5 illustrates a gravitational force vector.

As discussed above, the accelerometers 3 that are directional can measure the vector component of gravitational force that is in line with the direction of measurement of the accelerometer 3. FIG. 5 presents a diagram illustrating a gravitational force vector 50 of magnitude $g_z$. FIG. 5 also presents a direction of measurement 51 of one of the plurality of accelerometers 3 that measures acceleration in substantially one direction. As shown in FIG. 5, a vector component 52 of the gravitational force vector 50 in line with the direction of measurement 51 is depicted. The direction of the gravitational force vector 50 is used to define the vertical direction on the earth 7 and within the borehole 2.

Referring to FIG. 5, the magnitude of the vector component 52 of the gravitational force vector 50 measured by one of the accelerometers 3 is $g_z * \cos(\Theta))$ where $\Theta$ represents the angle between the vector component 52 and the gravitational force vector 50. Therefore, $g_z$ can be determined by dividing the measurement of the accelerometer 3 by the $\cos(\Theta))$.

Figure 6:
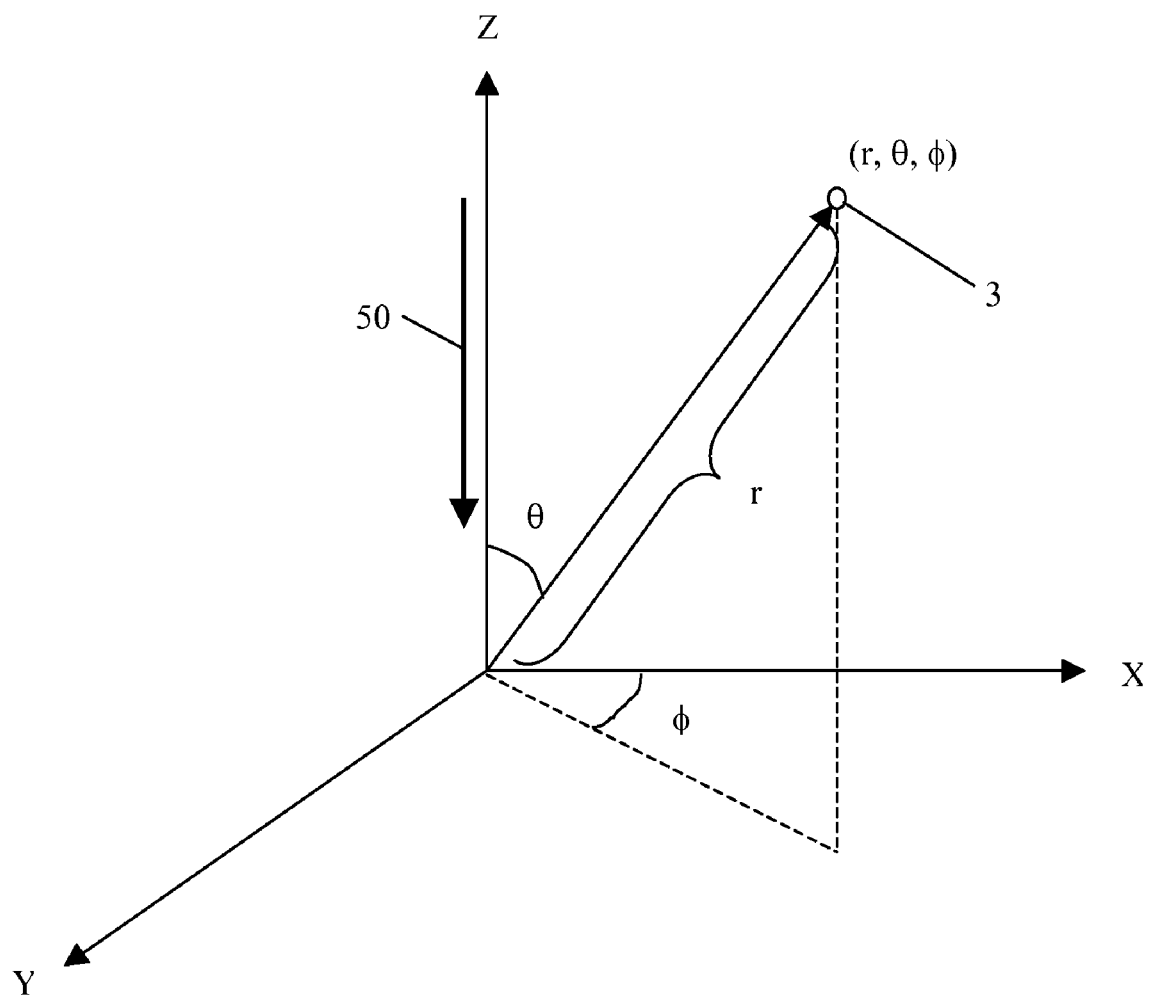
FIG. 6 illustrates a spherical coordinate system.

Corrections can be applied to the measurements performed by the plurality of accelerometers 3. The corrections use a spherical coordinate system as depicted in FIG. 6. The spherical coordinate system is used to indicate a location for each of the accelerometers 3. Referring to FIG. 6, the Z-axis is in line with the direction of the gravitational force vector 50. The angle $\theta$ measures the angle of the location from the Z-axis. The angle $\phi$ measures the angle of the location from the X-axis. The X-axis is assigned an arbitrary direction orthogonal to the Z-axis. The location of the i-th accelerometer of the plurality of accelerometers 3 is designated as $(r_i, \theta_i, \phi_i)$.

For the embodiment of FIG. 4, if the curved surface rotates about the center of curvature such that the Z-axis of the rotated coordinate system is not in line with the direction of the gravitational force vector 50, then the effects of the rotation on the measurement of gravity can be taken into account by the following series of equations. A rotation matrix R may be used to represent the rotation of the spherical coordinate system. Equation (1) is the rotation matrix R using the spherical coordinate system of FIG. 6 where $\alpha$ represents the angle of rotation in the X-Z plane, and $\beta$ is the angle of rotation in the X-Y plane.

$$R = \begin{pmatrix} \cos\alpha\cos\beta & -\sin\beta & -\sin\alpha\cos\beta \\ \cos\alpha\sin\beta & \cos\beta & -\sin\alpha\sin\beta \\ \sin\alpha & 0 & \cos\alpha \end{pmatrix} \quad (1)$$

Because the Z-axis of the rotated coordinate system is not in line with the gravitational force vector 50, the rotated coordinate system is rotated back to the original location before the rotation occurred. The rotated coordinate system can be rotated back by using the inverse of R, which is also the transpose of R. Equation (2) is used to calculate the rotation of the coordinate system back to the original coordinate system in rectangular coordinates.

$$\begin{pmatrix} x \\ y \\ z \end{pmatrix} = \begin{pmatrix} \cos\alpha\cos\beta & \cos\alpha\sin\beta & \sin\alpha \\ -\sin\beta & \cos\beta & 0 \\ -\sin\alpha\cos\beta & -\sin\alpha\sin\beta & \cos\alpha \end{pmatrix} \begin{pmatrix} r\sin\theta\cos\phi \\ r\sin\theta\sin\phi \\ r\cos\theta \end{pmatrix} \quad (2)$$

Equation (2) can be expanded to determine the Z-component, z. Equation (3) is used to determine z.

$$z = r(\cos\alpha\cos\theta - \sin\alpha\cos\beta\sin\theta\cos\phi - \sin\alpha\sin\beta\sin\theta\sin\phi) \quad (3)$$

Equation (3) can be used to represent the measurement of gravity, $g_i$, by the i-th accelerometer of the plurality of accelerometers 3 as shown in equation (4) where $g_z$ is the magnitude of the gravitational force vector 50.

$$g_i = g_z(\cos\alpha\cos\theta_i - \sin\alpha\cos\beta\sin\theta_i\cos\phi_i - \sin\alpha\sin\beta\sin\theta_i\sin\phi_i) \quad (4)$$

Equation (4) can be simplified as shown in equation (5) where $d_i$, A, B, and C are defined in equations (6), (7), (8) and (9) respectively.

$$d_i = A\cos\theta_i - B\sin\theta_i\cos\phi_i - C\sin\theta_i\sin\phi_i \quad (5)$$

$$d_i = g_i \quad (6)$$

$$A = g_z \cos\alpha \quad (7)$$

$$B = g_z \sin\alpha\cos\beta \quad (8)$$

$$C = g_z \sin\alpha\sin\beta \quad (9)$$

An object function can be constructed from equations (5) through (9) as shown in equation (10).

$$\psi(A, B, C) = \sum_{i=1}^{N}(d_i - A\cos\theta_i + B\sin\theta_i\cos\phi_i + C\sin\theta_i\sin\phi_i)^2 \quad (10)$$

By setting the derivative of the object function of equation (10) with respect to A, B, and C to zero, A, B, and C can be determined by solving equation (11).

$$\begin{pmatrix} \sum \cos^2\theta_i & -\sum \sin\theta_i\cos\theta_i\cos\phi_i & -\sum \sin\theta_i\cos\theta_i\sin\phi_i \\ \sum \sin\theta_i\cos\theta_i\cos\phi_i & -\sum \sin^2\theta_i\cos^2\phi_i & -\sum \sin^2\theta_i\sin\phi_i\cos\phi_i \\ \sum \sin\theta_i\cos\theta_i\sin\phi_i & -\sum \sin^2\theta_i\sin\phi_i\cos\phi_i & -\sum \sin^2\theta_i\sin^2\phi_i \end{pmatrix} \quad (11)$$

$$\begin{pmatrix} A \\ B \\ C \end{pmatrix} = \begin{pmatrix} \sum d_i\cos\theta_i \\ \sum d_i\sin\theta_i\cos\phi_i \\ \sum d_i\sin\theta_i\sin\phi_i \end{pmatrix}$$

The magnitude, $g_z$, of the gravitational force vector 50 can be calculated from equation (12).

$$g_z = \sqrt{A^2 + B^2 + C^2} \quad (12)$$

The angles $\alpha$ and $\beta$ can also be calculated. Equation (13) is used to calculate $\alpha$ and equation (14) is used to calculate $\beta$.

$$\alpha = \tan^{-1}\frac{\sqrt{B^2 + C^2}}{A} \quad (13)$$

$$\beta = \tan^{-1}\frac{C}{B} \quad (14)$$

Generally, the well logging instrument 10 includes adaptations as may be necessary to provide for operation during drilling or after a drilling process has been completed.

Figure 7:
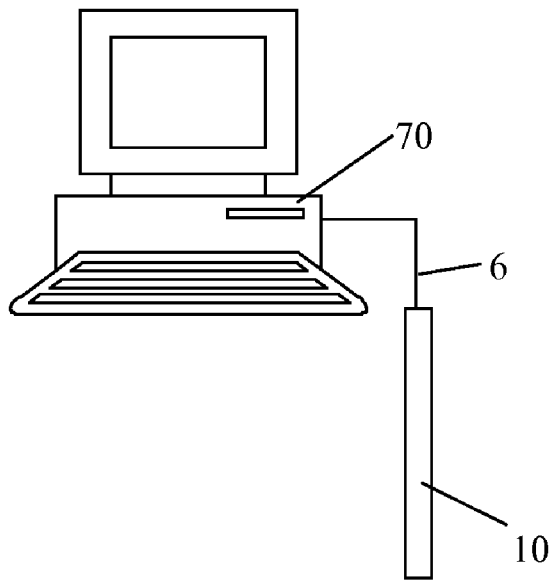
FIG. 7 illustrates an exemplary embodiment of a computer coupled to the logging instrument.

Referring to FIG. 7, an apparatus for implementing the teachings herein is depicted. In FIG. 7, the apparatus includes a processing system 70 coupled to the well logging instrument 10. In general, the processing system 70 includes components as necessary to provide for the real time processing of data from the well logging instrument 10. Exemplary components include, without limitation, at least one processor, storage, memory, input devices, output devices and the like. As these components are known to those skilled in the art, these are not depicted in any detail herein.

As an alternative to or in addition to the electronic unit 5, the processing system 70 can be configured to process output from the plurality of accelerometers 3 to estimate the gravitational acceleration and/or correct for systematic error in the sensor 9.

Generally, some of the teachings herein are reduced to an algorithm that is stored on machine-readable media. The algorithm is implemented by the processing system 70 and provides operators with desired output. The output is typically generated on a real-time basis.

The logging instrument 10 may be used to provide real-time measurements of various parameters such as gravity for example. As used herein, generation of data in "real-time" is taken to mean generation of data at a rate that is useful or adequate for making decisions during or concurrent with processes such as production, experimentation, verification, and other types of surveys or uses as may be opted for by a user or operator. As a non-limiting example, real-time measurements and calculations may provide users with information necessary to make desired adjustments during the drilling process. In one embodiment, adjustments are enabled on a continuous basis (at the rate of drilling), while in another embodiment, adjustments may require periodic cessation of drilling for assessment of data. Accordingly, it should be recognized that "real-time" is to be taken in context, and does not necessarily indicate the instantaneous determination of data, or make any other suggestions about the temporal frequency of data collection and determination.

A high degree of quality control over the data may be realized during implementation of the teachings herein. For example, quality control may be achieved through known techniques of iterative processing and data comparison. Accordingly, it is contemplated that additional correction factors and other aspects for real-time processing may be used. Advantageously, the user may apply a desired quality control tolerance to the data, and thus draw a balance between rapidity of determination of the data and a degree of quality in the data.

Figure 8:
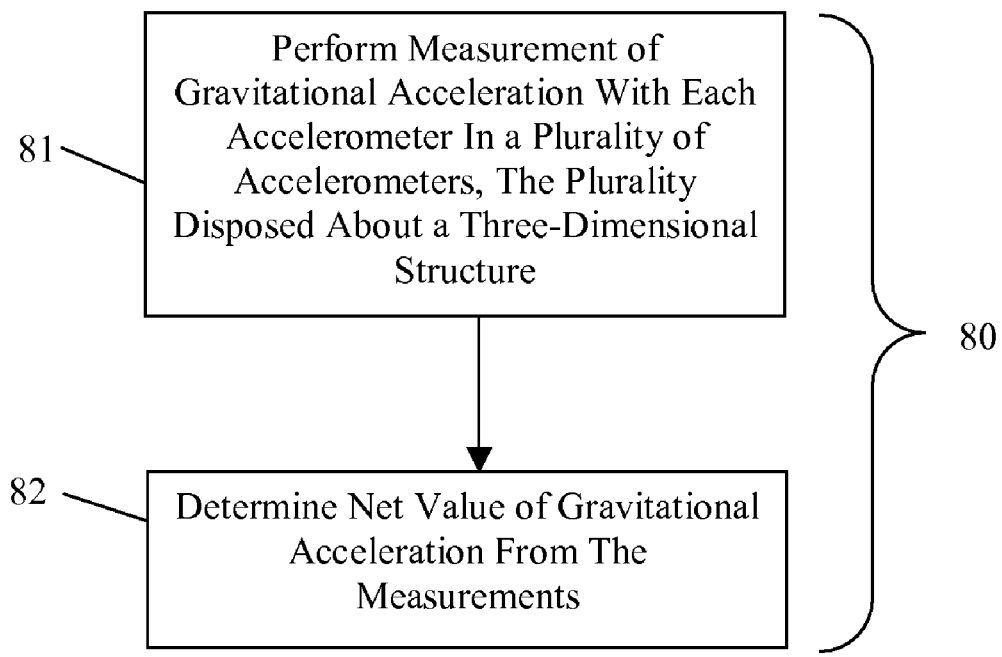
FIG. 8 presents one example of a method for measuring gravitational acceleration.

FIG. 8 presents one example of a method 80 for determining gravitational acceleration in the borehole 2. The method 80 calls for performing (step 81) a measurement of gravitational acceleration with each of the accelerometers 3. Further, the method 80 calls for determining (step 82) a net value for the gravitational acceleration from the individual measurements.

In some embodiments of the plurality of accelerometers 3 and the three-dimensional structure 20, the plurality of accelerometers 3 are built into the three-dimensional structure 20.

For example, the three-dimensional structure 20 may be a semiconductor, upon which the plurality of accelerometers 3 is built.

In certain embodiments, a string of two or more logging instruments 10 may be used where each logging instrument 10 includes at least the plurality of the accelerometers 3 disposed upon the three-dimensional structure 20. In these embodiments, a response from each logging instrument 10 may be used separately or combined with other responses to form a composite response.

Techniques for correcting systematic errors are now presented. With respect to the present disclosure, systematic errors are biases in the measurement of gravitational acceleration or in an output of each accelerometer 3. The biases are such that the mean of many measurements of gravitational acceleration differs significantly from the actual value of the gravitational acceleration being measured. Systematic errors arise when the amount of error and the associated sign are unknown.

There are several types of systematic errors that can affect the sensor 9. One type is "offset bias." With offset bias, the output of an accelerometer 3 is offset a fixed amount from the true value throughout a range of values. Thus, when a true value of gravitational acceleration is zero in the associated direction of sensitivity of the accelerometer 3, the output of the accelerometer 3 indicates the fixed amount of offset.

Another type of systematic error is proportional error, which may also be referred to as scaling factor or scaling sensitivity error. Proportional error is related to a proportion of the true value of gravitational acceleration being measured. For example, if the true value of gravitational acceleration being measured is 1.0 g and the proportional error is plus ten percent, then the output of the sensor will be 1.1 g.

The techniques for correcting systematic errors call for rotating the sensor 9 about an axis (a first axis) and performing a set of measurements with the accelerometers 3. The set of measurements, which can be used for calibration purposes, are then analyzed to determine any systematic error. For example, if the axis of rotation is the longitudinal axis 11 and the borehole 2 is vertical, then the accelerometers 3 with a direction of sensitivity perpendicular to the longitudinal axis 11 are expected not to measure any gravitational acceleration. Any reading of non-zero gravitational acceleration can be attributed to systematic error and, thus, identified and corrected.

For those accelerometers 3 with the direction of sensitivity parallel to the longitudinal axis 11 throughout the rotation, measurements are expected to be constant. Thus, a non-constant measurement with these accelerometers 3 can be attributed to systematic error such as that caused by misalignment of an accelerometer 3 with respect to the sensor 9.

The techniques also call for rotating the sensor 3 about another axis (a second axis) and performing a second set of calibration measurements. In general, the second axis is perpendicular to the longitudinal axis 11. During a 360 degree rotation about the second axis, those accelerometers 3 with directions of sensitivity that change with respect to the direction of gravitational acceleration have an output that is sinusoidal in shape. The output of those accelerometers 3 is expected to vary: (1) from zero when the direction of sensitivity is perpendicular to the direction of gravitational acceleration, (2) to the positive value of gravitational acceleration when the direction of sensitivity is parallel to and in the same direction as the direction of gravitational acceleration, (3) back to zero when the direction of sensitivity is again perpendicular to the direction of gravitational acceleration, and (4) to a negative value of gravitational acceleration when the direction of sensitivity is parallel to and opposite the direction of gravitational acceleration. Deviations from expectations can indicate systematic error.

As with the rotation about the first axis, those accelerometers 3 with directions of sensitivity that (1) do not change throughout the rotation and (2) are perpendicular to the direction of gravitational acceleration are expected to output a zero gravity measurement. Deviations from zero gravity can indicate systematic error.

Systematic error can also be identified by the 360-degree rotation about the second axis. For example, offset bias can be identified if the output sine wave is not zero when the direction of sensitivity is perpendicular to the direction of gravitational acceleration.

The outputs of those accelerometers 3 with the same direction of sensitivity can be compared during or after any of the rotations. Differences in the outputs can be used to identify systematic error such as scale sensitivity.

Rotation of the sensor 9 for calibration purposes requires precise and accurate positioning information. Positioning information that is not accurate can lead to systematic errors that are in proportion to an amount of positioning error.

In one embodiment, a measurement at one rotational position can be compared to another measurement made 180 degrees apart. While the sign of one measurement may be opposite of the sign of the other measurement, the magnitudes are expected to be the same. Thus, differences in magnitude can indicate systematic error. Similarly, measurements can be compared at other angular positions expected to yield measurements of the same magnitude.

While one embodiment disclosed above involves rotation of the sensor 9 about two orthogonal axes, the sensor 9 can also be rotated about a third orthogonal axis with systematic error being identified using the above disclosed techniques.

Figure 9:
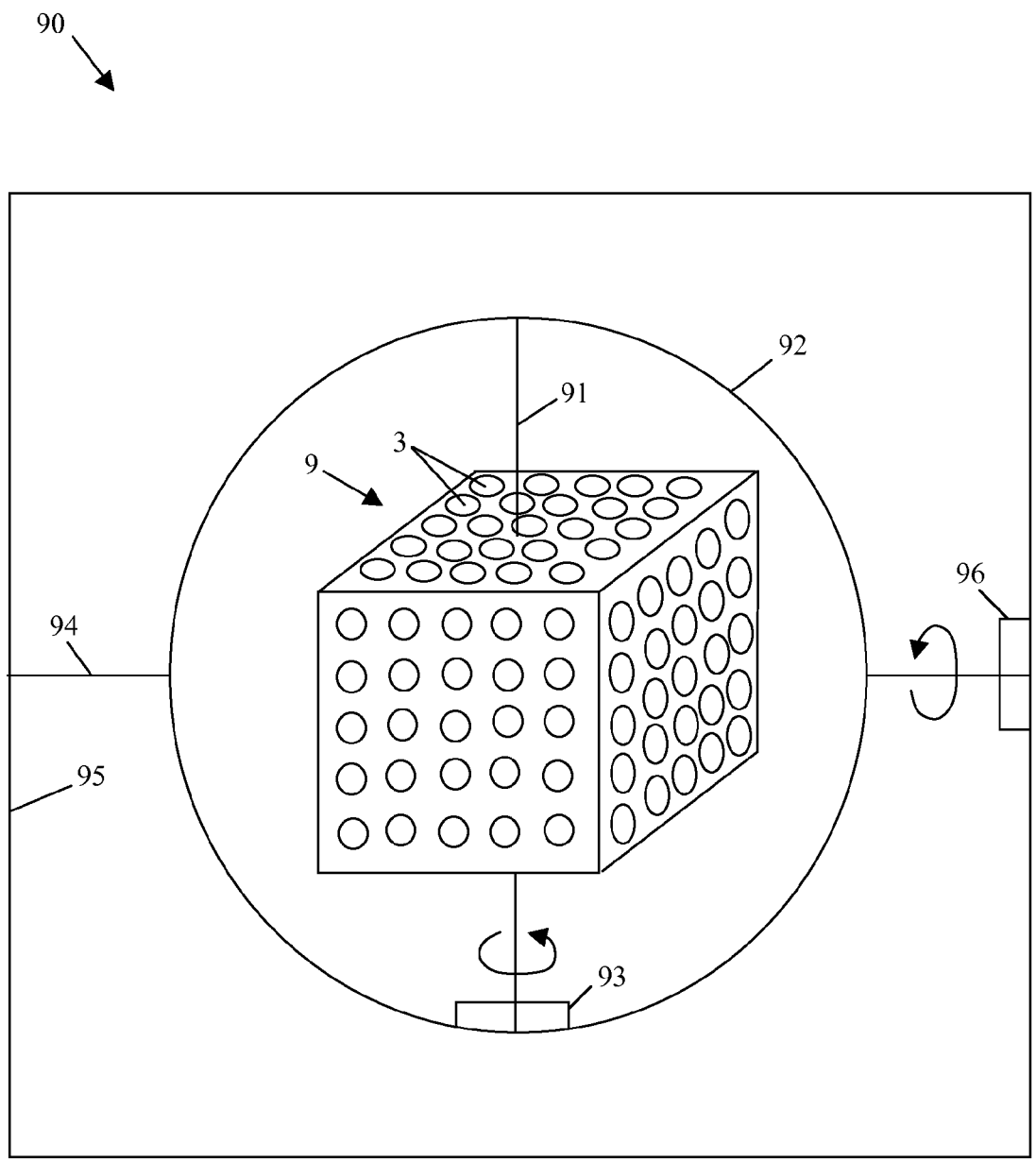
FIG. 9 illustrates an exemplary embodiment of a rotational device coupled to the sensor.

An exemplary embodiment of a rotational device 90 for rotating the sensor 9 about a first axis 91 and a second axis 94 is illustrated in FIG. 9. In the embodiment of FIG. 9, the second axis 94 is orthogonal to the first axis 91. The rotational device 90 includes a first rotational support 92 in operable communication with a first rotational motive force device 93 for rotating the sensor 9 about the first axis 91. Similarly, the rotational device 90 includes a second rotational support 95 in operable communication with a rotational motive force device 96 for rotating the sensor 9 about the second axis 94. In one embodiment, the first rotational support 92 and the second rotational support 95 are gimbals.

Once the systematic error is identified and quantified, the systematic error can be removed from the measurement of gravitational acceleration by the sensor 9. In one embodiment, the systematic error associated with each individual accelerometer 3 is removed prior to combining the measurements from the plurality of accelerometers 3 to determine the gravitational acceleration. In another embodiment, the systematic error from each of the accelerometers 3 is combined such as in an average or a weighted average, and then the combined systematic error is removed from the combined output of the accelerometers 3.

Figure 10:
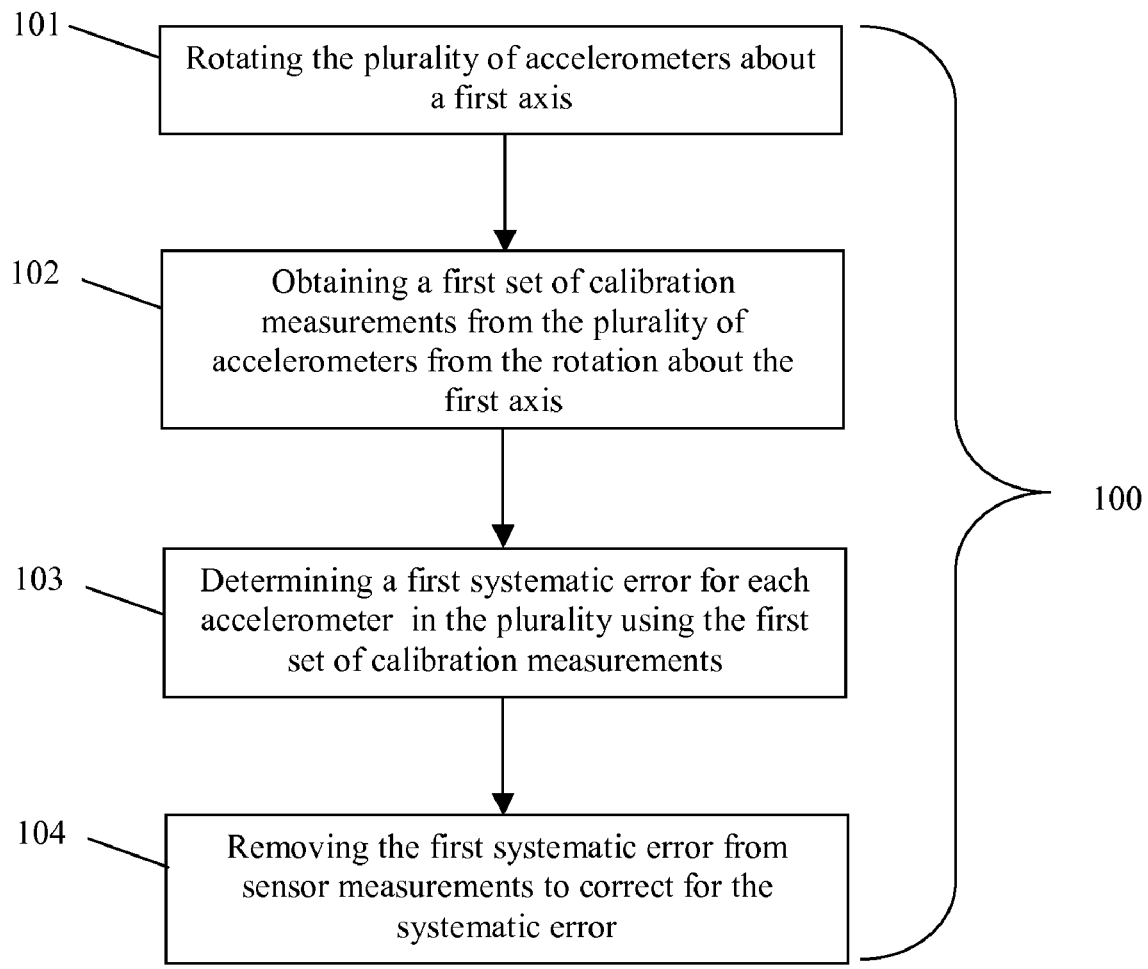
FIG. 10 presents one example of a method for correcting for systematic error.

FIG. 10 presents one example of a method 100 to correct for a systematic error of the sensor 9 having the plurality of accelerometers 3 configured to measure gravitational acceleration. The method 100 calls for (step 101) rotating the plurality of accelerometers 3 about the first axis 91. Further, the method 100 calls for (step 102) obtaining a first set of calibration measurements from the rotation about the first axis 91. Further, the method 100 calls for (step 103) determining a first systematic error for each accelerometer 3 in the plurality using the first set of calibration measurements. Further, the method 100 calls for (step 104) removing the first systematic error from sensor measurements to correct for the systematic error. Offset bias systematic error can be removed by addition or subtraction depending on the sign of the offset bias. Proportional systematic error can be removed by adjusting the output of each accelerometer 3 or sensor 9 in an amount determined from the proportion and in a direction to compensate for the proportional error.

In support of the teachings herein, various analysis components may be used, including digital and/or analog systems. The digital and/or analog systems may be used in the electronic unit 5 used for at least one of processing output and collecting data from each of the accelerometers 3 or in the processing system 70. The electronic unit 5 may be disposed at the logging instrument 10 or incorporated into the processing system 70. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, sensor, transmitter, receiver, transceiver, antenna, controller, lens, optical unit, light source, light detector, electrical unit, electromechanical unit, rotational support, or a motive force for supplying rotational, translational, or propulsional force may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method to correct for a systematic error of a sensor comprising a plurality of collocated accelerometers configured to measure gravitational acceleration, the method comprising:
   rotating the plurality of collocated accelerometers about a first axis, the plurality of collocated accelerometers providing output used for measuring the gravitational acceleration, each accelerometer in the plurality having a direction of sensitivity wherein at least two of the accelerometers in the plurality have different directions of sensitivity;
   obtaining a first set of calibration measurements from the plurality of accelerometers from the rotation about the first axis;
   determining a first systematic error for each accelerometer in the plurality using the first set of calibration measurements; and
   removing the first systematic error from sensor measurements to correct for the systematic error.

2. The method of claim 1, further comprising:
   rotating the sensor about a second axis;
   obtaining a second set of calibration measurements from the plurality of accelerometers from the rotation about the second axis;
   determining a second systematic error for each accelerometer in the plurality using the first set of calibration measurements; and
   removing the second systematic error from the future measurements.

3. The method of claim 2, wherein the first axis is a longitudinal axis of a logging instrument comprising the sensor.

4. The method of claim 3, wherein the second axis is orthogonal to the first axis.

5. The method of claim 1, wherein the first set of calibration measurements comprises a series of measurements performed by at least one accelerometer in the plurality of collocated accelerometers.

6. The method of claim 1, wherein the sensor is rotated 360 degrees about the first axis.

7. The method of claim 6, wherein the first set of calibration measurements correlates to a sine curve.

8. The method of claim 1, wherein each accelerometer has a direction of sensitivity and a first accelomenter in the plurality has a first direction of sensitivity and a second accelerometer in the plurality has a second direction of sensitivity that is different from the first direction of sensitivity.

9. The method of claim 1, wherein the systematic error is at least one of an offset bias and an error proportional to a value output by an accelerometer in the plurality.

10. The method of claim 1, wherein the systematic error is due to misalignment of an accelerometer in the plurality.

11. The method of claim 1, wherein removing comprises:
    subtracting the associated first systematic error from a measurement performed by each accelerometer.

12. The method of claim 1, wherein removing comprises:
    averaging the first systematic errors to determine an average systematic error; and subtracting the average systematic error from a composite response that combines measurements performed by the accelerometers in the plurality.

13. The method of claim 1, wherein the method is implemented by computer executable instructions stored on a non-transitory computer readable medium.

14. A sensor for measuring gravitational acceleration and correcting for systematic error, sensor comprising:
- a plurality of collocated accelerometers providing output used for measuring the gravitational acceleration, each accelerometer in the plurality having a direction of sensitivity wherein at least two of the accelerometers in the plurality have different directions of sensitivity;
- a rotational device configured to rotate the plurality of collocated accelerometers about a first axis; and
- a processing system in communication with the plurality of collocated accelerometers, wherein the processing system is configured to:
  - obtain a first set of calibration measurements from the plurality of accelerometers from rotation of the plurality about the first axis;
  - determine a first systematic error for each accelerometer in the plurality using the first set of calibration measurements; and
  - removing the first systematic error from sensor measurements to correct for the systematic error.

15. The sensor of claim 14, wherein the first axis is a longitudinal axis of a logging instrument comprising the sensor.

16. The sensor of claim 14, wherein the rotational device is further configured to rotate the plurality of accelerometers about a second axis.

17. The sensor of claim 16, wherein the processing system is further configured to:
- obtain a second set of calibration measurements from the plurality of accelerometers from rotation of the plurality about the second axis;
- determine a second systematic error for each accelerometer in the plurality using the second set of calibration measurements; and
- removing the second systematic error from sensor measurements.

18. The sensor of claim 17, wherein the second axis is orthogonal to the first axis.

19. The sensor of claim 14, wherein the rotational device comprises a gimbal.

20. An apparatus for measuring gravitational acceleration in a borehole and correcting for systematic error, the apparatus comprising:
- a logging instrument;
- a plurality of collocated accelerometers disposed at the logging instrument, the plurality providing output used for measuring the gravitational acceleration, each accelerometer in the plurality having a direction of sensitivity wherein at least two of the accelerometers in the plurality have different directions of sensitivity;
- a rotational device configured to rotate the plurality of collocated accelerometers about a first axis; and
- a processing system in communication with the plurality of collocated accelerometers, wherein the processing system is configured to:
  - obtain a set of calibration measurements from the plurality of accelerometers from rotation of the plurality about the first axis;
  - determine a systematic error for each accelerometer in the plurality using the set of calibration measurements; and
  - remove the first systematic error from sensor measurements to correct for the systematic error.

* * * * *